(No Model.) 2 Sheet—Sheet 2.

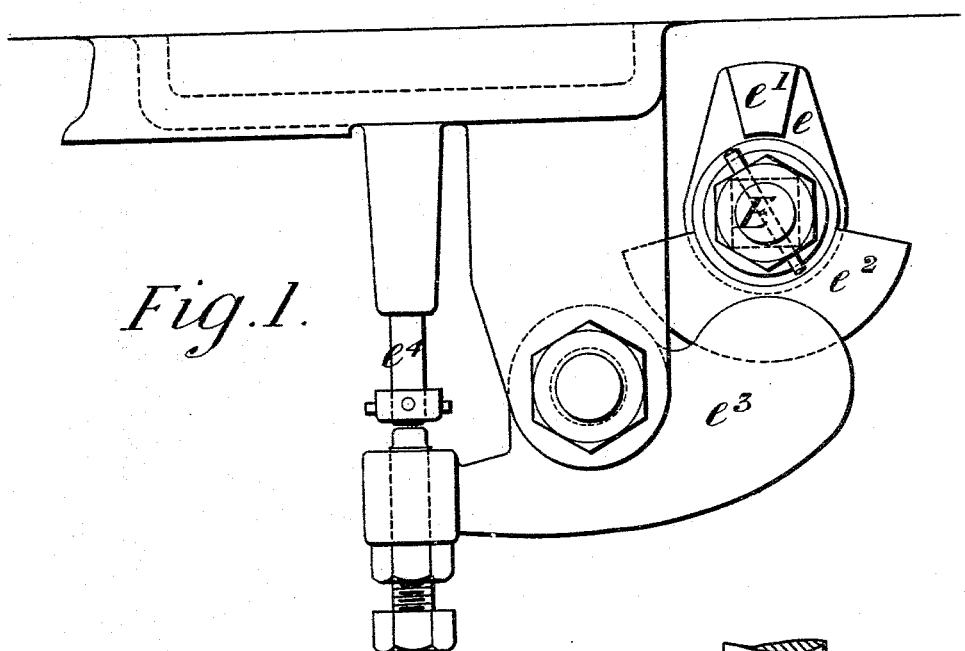
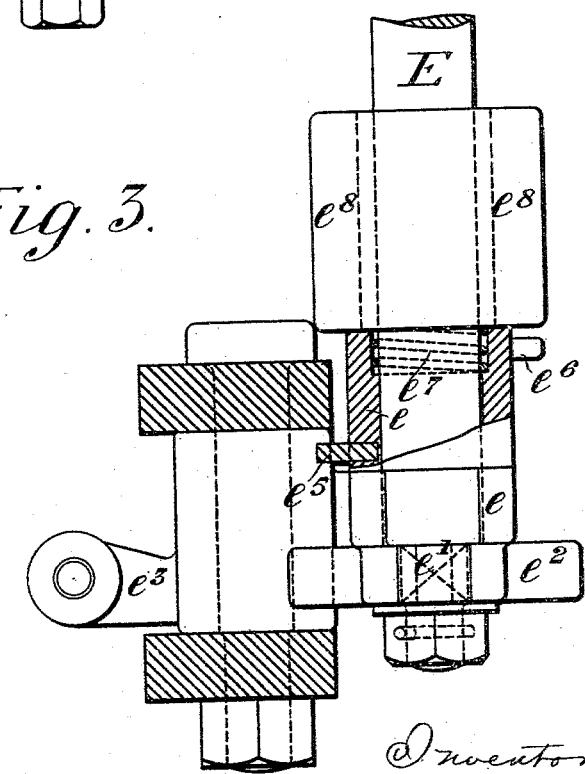

H. P. HOLT.
REVERSING VALVE GEAR FOR GAS OR OIL MOTOR ENGINES.

No. 545,363. Patented Aug. 27, 1895.

Witnesses

Inventor,
Henry Percy Holt,
By James L. Norris.
Atty.

UNITED STATES PATENT OFFICE.

HENRY P. HOLT, OF LONDON, ENGLAND.

REVERSING VALVE-GEAR FOR GAS OR OIL MOTOR ENGINES.

SPECIFICATION forming part of Letters Patent No. 545,363, dated August 27, 1895.

Application filed April 20, 1895. Serial No. 546,586. (No model.) Patented in France August 4, 1894, No. 240,557, and in Belgium August 4, 1894, No. 111,251.

*To all whom it may concern:*

Be it known that I, HENRY PERCY HOLT, a citizen of England, residing at 22 Chancery Lane, London, in the county of London, England, have invented certain new and useful Reversing Valve-Gears for Gas or Oil Motor Engines, (for which patents have been granted in France, dated August 4, 1894, No. 240,557, and in Belgium, dated August 4, 1894, No. 111,251,) of which the following is a specification.

My invention relates to valve-gear for gas or oil motor engines so arranged as to suit revolution of the engine-shaft in either direction, as I shall describe, referring to the accompanying drawings.

Figure 5:
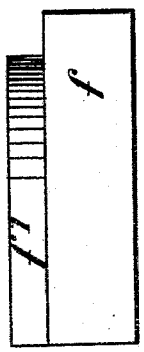
Figure 4:
Figure 2:
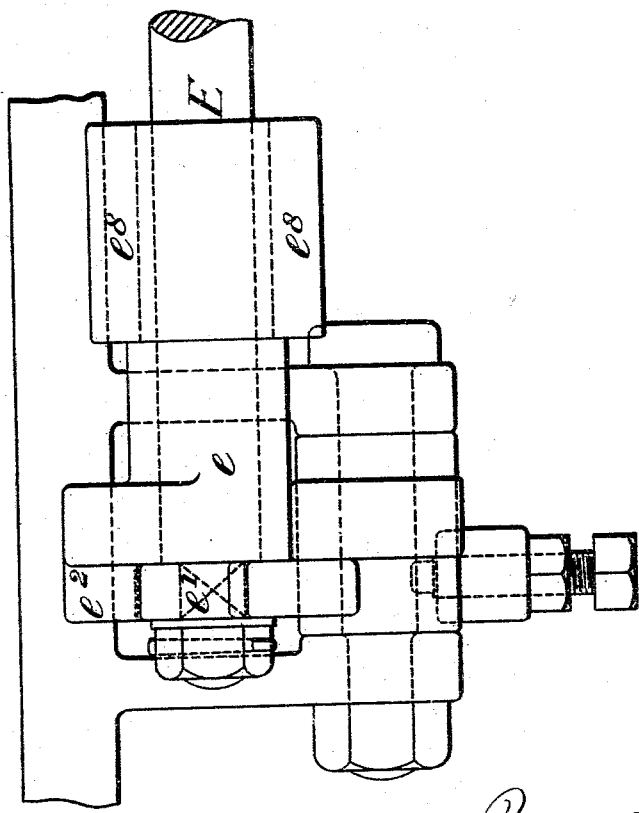

Figure 1 is an end view, Fig. 2 is a side view, and Fig. 3 is a plan partly in section, of part of the valve counter-shaft and gear connected therewith. Fig. 4 is a plan, and Fig. 5 is a side view, of the cam for working the valve which supplies gas or oil vapor.

E is the valve counter-shaft, which, as usual in gas-engines of the Otto cycle, is driven at half the speed of the crank-shaft and carries loose upon it the cam $e$, which has on it a lateral projecting tooth $e'$. On the shaft E is fixed a boss with a projecting segment $e^2$. According as the shaft revolves in the one direction or the other the one or the other face of the segment $e^2$, acting against the tooth $e'$, drives the cam $e$. This cam acting on the rounded end (or it might be on a roller) of the lever $e^3$, moves the stem $e^4$ of the exhaust-valve once in every two revolutions. On the same cam is a protuberance $e^5$, which moves the gas-supply valve, and there is also at a suitable part of the cam a protuberance $e^6$ for working the ignition apparatus. As the exhaust-valve, the gas-supply valve, and the ignition-gear are all of the ordinary kind, details of these are not shown. In order to prevent the cam $e$ from being so loose that it might fall over, a spring $e^7$ is arranged to press against a bearing $e^8$, and so to press the cam $e$ against the boss $e^2$. Instead of employing a simple cam $e^5$ for working the gas-supply valve, I prefer to make it, as shown in Figs. 4 and 5, with a step, the one part $f$ to act on the valve when the full gas is required, and the other part $f'$ to act when a less supply of gas is required. The tappet or roller on which either of these parts is to act is moved over the one part or the other by a centrifugal governor in the usual way.

When the valve-gear is arranged as above described, I am enabled to reverse the engine in the following manner: The supply of gas is cut off until the speed is so far reduced that the fly-wheel has scarcely sufficient momentum to carry the crank over the back center. The cylinder then receives a charge, and the crank, just before it can reach the back center, passes a point in its path where ignition is usually effected, the protuberance $e^6$ being suitably placed for this purpose. The charge being ignited, propels the crank backward, thus reversing the engine and reopening the gas-supply valve, so that the engine goes on as before, but in the opposite direction.

Having thus described the nature of my said invention and the best means I know for carrying the same into practical effect, I claim—

In a gas or oil motor engine in combination with the valve countershaft a compound cam for working the exhaust and gas supply valves and the ignition apparatus, loose upon the shaft, and having a projecting tooth, arranged to meet either face of a driving segment fixed on the shaft, substantially as and for the purpose set forth.

In testimony whereof I have signed my name to this specification, in the presence of two subscribing witnesses, this 8th day of April, A. D. 1895.

HENRY P. HOLT.

Witnesses:
 OLIVER DUVALL,
 JNO. P. M. MILLARD.